(12) United States Patent
Wu et al.

(10) Patent No.: US 11,392,169 B2
(45) Date of Patent: Jul. 19, 2022

(54) FOLDABLE TERMINAL DEVICE

(71) Applicant: HUAWEI TECHNOLOGIES CO., LTD., Guangdong (CN)

(72) Inventors: Wenwen Wu, Dongguan (CN); Wen Fan, Dongguan (CN); Tao Huang, Dongguan (CN); Xin Zhu, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 208 days.

(21) Appl. No.: 16/923,388

(22) Filed: Jul. 8, 2020

(65) Prior Publication Data

US 2020/0341509 A1 Oct. 29, 2020

Related U.S. Application Data

(63) Continuation of application No. PCT/CN2019/070628, filed on Jan. 7, 2019.

(30) Foreign Application Priority Data

Jan. 9, 2018 (CN) .......................... 201810020258.6
Jan. 3, 2019 (CN) .......................... 201910010463.9

(51) Int. Cl.
*G06F 1/16* (2006.01)
*H04M 1/02* (2006.01)
*F16C 11/04* (2006.01)

(52) U.S. Cl.
CPC .......... *G06F 1/1616* (2013.01); *G06F 1/1652* (2013.01); *G06F 1/1681* (2013.01); *H04M 1/022* (2013.01); *H04M 1/0216* (2013.01); *H04M 1/0268* (2013.01); *F16C 11/04* (2013.01)

(58) Field of Classification Search
CPC .... G06F 1/1616; G06F 1/1652; G06F 1/1681; H04M 1/0216; H04M 1/0268; H04M 1/022
See application file for complete search history.

(56) References Cited

U.S. PATENT DOCUMENTS

| | | | | |
|---|---|---|---|---|
| 9,173,287 B1* | 10/2015 | Kim | ...................... | G06F 1/1681 |
| 9,204,565 B1* | 12/2015 | Lee | ...................... | E05F 1/1016 |
| 9,557,771 B2* | 1/2017 | Park | ...................... | H04M 1/022 |
| 10,028,395 B2* | 7/2018 | Chen | ...................... | G06F 1/1626 |

(Continued)

FOREIGN PATENT DOCUMENTS

| CN | 104680940 A | 6/2015 |
|---|---|---|
| CN | 105407194 A | 3/2016 |

(Continued)

*Primary Examiner* — Nidhi Thaker
(74) *Attorney, Agent, or Firm* — Womble Bond Dickinson (US) LLP

(57) ABSTRACT

This application discloses a foldable terminal device, including: a foldable flexible panel, a first support component, a second support component, and a connection mechanism, where the flexible panel includes a first display area, a second display area, and a bending area, and the bending area is located between the first display area and the second display area; the connection mechanism connects the first support component and the second support component, the connection mechanism connects the first support component and the second support component, the connection mechanism is scalable.

4 Claims, 13 Drawing Sheets

(56) References Cited

U.S. PATENT DOCUMENTS

| | | | |
|---|---|---|---|
| 10,306,783 B2* | 5/2019 | Seo | E05D 1/04 |
| 10,775,852 B2* | 9/2020 | Kim | H04M 1/022 |
| 10,817,030 B2* | 10/2020 | Pelissier | G06F 1/1652 |
| 10,827,633 B2* | 11/2020 | Yoo | E05D 3/122 |
| 10,883,534 B2* | 1/2021 | Bae | G06F 1/1652 |
| 10,928,863 B2* | 2/2021 | Pelissier | G06F 1/1681 |
| 2013/0293444 A1* | 11/2013 | Sano | G06F 1/1616 |
| | | | 345/1.3 |
| 2016/0085265 A1* | 3/2016 | Park | G06F 1/1681 |
| | | | 361/807 |
| 2016/0302316 A1* | 10/2016 | Jeong | H05K 5/0226 |
| 2017/0201607 A1* | 7/2017 | Xu | H04M 1/0268 |
| 2017/0285691 A1* | 10/2017 | Baek | G06F 1/1675 |
| 2018/0210497 A1* | 7/2018 | Lin | E05D 3/06 |

FOREIGN PATENT DOCUMENTS

| | | |
|---|---|---|
| CN | 105491193 A | 4/2016 |
| CN | 105611006 A | 5/2016 |
| CN | 205657718 U | 10/2016 |
| CN | 106328007 A | 1/2017 |
| CN | 206559414 U | 10/2017 |
| CN | 105549689 B | 1/2018 |
| CN | 106205385 B | 4/2019 |
| EP | 3355161 A1 | 8/2018 |
| EP | 3393110 A1 | 10/2018 |
| JP | 2006287982 A | 10/2006 |
| WO | 2019011143 A1 | 1/2019 |

\* cited by examiner

FOLDABLE TERMINAL DEVICE

CROSS-REFERENCE TO RELATED APPLICATIONS

This application is a continuation of International Application No. PCT/CN2019/070628 filed on Jan. 7, 2019, which claims priority to Chinese Patent Application No. 201910010463.9, filed on Jan. 3, 2019, which claims priority to Chinese Patent Application No. 201810020258.6, filed on Jan. 9, 2018, all of which are hereby incorporated by reference in their entireties.

TECHNICAL FIELD

This application relates to the field of electronic device technologies, and specifically, to a foldable terminal device.

BACKGROUND

With intelligentization of a terminal device, the terminal device can provide increasing more functions, especially, for example, a mobile terminal such as a mobile phone or a tablet computer. The mobile terminal has been widely used by a user to browse a web page, watch a video, play a game, and the like.

When a terminal device, especially a mobile terminal, is used to browse a web page or watch a video, a larger screen of the terminal device provides a better visual effect and better user experience. However, a terminal device with a large screen has poorer holding comfortability and portability than a terminal device with a small screen.

Therefore, with gradual commercial use of a flexible panel of an organic light emitting semiconductor (OLED) material, a foldable terminal device becomes an innovative direction of major terminal device vendors. Currently, there is a foldable terminal device design. In the design, one flexible panel is attached to two or more support modules that are connected by using a connection mechanism, to implement folding and unfolding. Although this design can implement folding, frequent folding may cause the flexible panel to slide relative to the support modules, and a screen function becomes invalid because the flexible panel is often stretched and squeezed.

SUMMARY

Embodiments of this application provide a foldable terminal device, to separate a display area and a bending area on a flexible panel. A distance between a connection structure and a first support component and/or a distance between the connection structure and a second support component are/is adjustable. This resolves a problem that a screen function is invalid because the flexible panel of the terminal device is stretched or squeezed by frequent force in a process of folding or unfolding.

According to a first aspect, an embodiment of this application provides a foldable terminal device, including: a foldable flexible panel, a first support component, a second support component, and a connection mechanism, where the foldable flexible panel includes a first display area, a second display area, and a bending area, and the bending area is located between the first display area and the second display area; the first support component supports the first display area and is fixed to the first display area, and the second support component supports the second display area and is fixed to the second display area; the connection mechanism connects the first support component and the second support component, the connection mechanism is scalable, and a maximum scalable amplitude of the connection mechanism is corresponding to a width of the bending area.

In a process of folding or unfolding the terminal device, at least one of the first support component and the second support component rotates by external force and drives the connection mechanism to scale, an angle by which the at least one of the first support component and the second support component rotates is in a one-to-one correspondence with a scaling displacement of the connection mechanism, and a bending angle of the foldable flexible panel is in a one-to-one correspondence with the scaling displacement of the connection mechanism, to prevent the foldable flexible panel from being stretched or squeezed in the process of folding or unfolding the terminal device. Specifically, the bending angle of the flexible panel refers to a bending angle of the bending area of the foldable flexible panel.

It can be learned from the first aspect that the display area and the bending area on the flexible panel are separated, and a distance between a connection structure and the first support component and/or a distance between the connection structure and the second support component are/is adjustable. This effectively prevents the flexible panel of the terminal device from being stretched or squeezed by frequent force in the process of folding or unfolding, thereby protecting the flexible panel well and prolonging a service life of the terminal device.

In some embodiments, the connection mechanism includes a first sliding block and a second sliding block, a first sliding track is disposed on the first support component, a second sliding track is disposed on the second support component, the first sliding block is configured to slide in the first sliding track, and the second sliding block is configured to slide in the second sliding track. It can be learned from this embodiment that in the process of folding or unfolding the terminal device, the first sliding block and the second sliding block slide in a cooperation manner, so that folding or unfolding can be conveniently performed. This can effectively reduce stretching and squeezing on a flexible screen.

In some embodiments, in the process of folding or unfolding the terminal device, a first displacement generated by sliding of the first sliding block is corresponding to a first angle by which the first support component rotates, and a second displacement generated by sliding of the second sliding block is corresponding to a second angle by which the second support component rotates. It can be learned from this embodiment that the displacement generated by sliding of the sliding block is corresponding to the angle by which the support component rotates. Effective cooperation between rotation and sliding is implemented, and the flexible panel is not stretched or squeezed during rotation.

In some embodiments, the foldable flexible panel is disposed on an outer surface of the terminal device.

In some embodiments, the width of the bending area falls within a value range (D, D+a) including a sum of a thickness of the first support component and a thickness of the second support component, where D represents the sum of the thicknesses, a represents an offset, and a is greater than 0. In other words, the width of the bending area is greater than the sum of the thickness of the first support component and the thickness of the second support component, or the width of the bending area may be greater than a sum of the thickness of the first support component, the thickness of the second support component, and an overall thickness of an adhesive between the flexible panel and the first support component and an adhesive between the flexible panel and the second support component. In some embodiments, the first display area and the second display area can be prevented from being affected by folding of the terminal device.

In some embodiments, a sum of a sliding distance of the first sliding block and a sliding distance of the second sliding block is greater than or equal to the width of the bending area. In other words, in the process of unfolding, the first sliding block and the second sliding block slide out of the bending area, so that the bending area can more conveniently rotate with the first support component and the second support component, and the flexible panel of the bending area is not stretched; or in the process of folding, the flexible panel of the bending area is prevented from being squeezed, thereby protecting the flexible panel well.

In some embodiments, after a start displacement is generated when at least one of the first sliding block and the second sliding block slides, the flexible panel rotates with the first support component and the second support component, and the start displacement is greater than or equal to an amplitude of shrinking or stretching of the flexible panel when the flexible panel rotates. Such a design manner can implement pre-adjustment. The first sliding block and the second sliding block are prepared in advance for the displacement before the flexible panel rotates, thereby avoiding stretching or shrinking of the flexible panel and effectively avoiding sliding of the flexible panel on the support component.

In some embodiments, the connection mechanism is fixedly connected to the bending area. In this embodiment, that the connection mechanism is fixedly connected to the bending area can ensure a more stable bonding effect of the flexible panel.

In some embodiments, the connection mechanism further includes a rotating shaft mechanism, and the first sliding block and the second sliding block are respectively installed on two sides of the rotating shaft mechanism. In the process of folding or unfolding, the first support component and the second support component respectively drive a first base plate and a second base plate to rotate, and the first sliding block and the second sliding block rotate around the rotating shaft mechanism respectively under the driving of the first base plate and the second base plate. It can be learned from this embodiment that the sliding block and the rotating shaft mechanism in the connection mechanism effectively cooperate to implement conversion from sliding of the sliding block to rotation of the rotating mechanism, so that folding or unfolding can be conveniently performed.

In some embodiments, the terminal device further includes a first base plate and a second base plate, the first base plate is fixedly connected to the first support component, and the second base plate is fixedly connected to the second support component; the connection mechanism includes a first sliding block and a second sliding block; and a first sliding track is disposed on the first base plate, a second sliding track is disposed on the second base plate, the first sliding block is configured to slide in the first sliding track, and the second sliding block is configured to slide in the second sliding track; a first sliding rail is disposed on the first sliding block, a first sliding slot is disposed on the first base plate, a second sliding rail is disposed on the second sliding block, and a second sliding slot is disposed on the second base plate; the first sliding block and the first base plate are movably connected by using the first sliding rail and the first sliding slot, and the second sliding block and the second base plate are movably connected by using the second sliding rail and the second sliding slot; and when the first sliding block and the second sliding block rotate around the rotating shaft mechanism, the first sliding rail slides in the first sliding slot within an adjustable distance between the first support component and the connection mechanism, and the second sliding rail slides in the second sliding slot within an adjustable distance between the second support component and the connection mechanism. In some embodiments, the sliding slot and the sliding rail cooperate to implement sliding of the sliding block on the base plate.

In some embodiments, the rotating shaft mechanism includes a first rotating shaft, a second rotating shaft, a push block, and a push rod, where the push block and the push rod are connected by using a first connecting piece; a first connecting rod and a second connecting rod are installed on the push rod, the first connecting rod and a third connecting rod are movably connected by using a second connecting piece, and the second connecting rod and a fourth connecting rod are movably connected by using a third connecting piece; the third connecting rod is connected to the first base plate by using a fourth connecting piece, the third connecting rod is connected to the first sliding block by using a fifth connecting piece, the fourth connecting rod is connected to the second base plate by using a sixth connecting piece, and the fourth connecting rod is connected to the second sliding block by using a seventh connecting piece; and the first base plate and the second base plate respectively drive the first rotating shaft and the second rotating shaft to rotate, so that the push block drives the push rod to slide in a vertical direction; the push rod drives the first connecting rod and the second connecting rod to slide in a vertical direction; and the first connecting rod drives the third connecting rod to rotate, the third connecting rod rotates to drive the first sliding block to slide on the first base plate, the second connecting rod drives the fourth connecting rod to rotate, and the fourth connecting rod drives the second sliding block to slide on the second base plate. In some embodiments, a mechanical structure design is used to implement cooperation between rotation of the rotating shaft and sliding of the sliding block.

In some embodiments, a rotating shaft sliding slot is disposed on each of the first rotating shaft and the second rotating shaft, and convex hulls are disposed on the push block; and when the first rotating shaft and the second rotating shaft rotate, the convex hulls on the push block slide in the rotating shaft sliding slot, so that the push block drives the push rod to slide in a vertical direction.

In some embodiments, the first sliding block includes a first irregular hole, the rotating shaft mechanism includes a first irregular shaft, and the first irregular shaft passes through the first irregular hole, so that the first sliding block is connected to the rotating shaft mechanism; and the second sliding block includes a second irregular hole, the rotating shaft mechanism includes a second irregular shaft, and the second irregular shaft passes through the second irregular hole, so that the second sliding block is connected to the rotating shaft mechanism.

In some embodiments, the terminal device further includes a first base plate and a second base plate, the first base plate is fixedly connected to the first support component, and the second base plate is fixedly connected to the second support component, the connection mechanism includes a first sliding block, a second sliding block, and a rotating shaft mechanism, the first sliding block and the second sliding block are respectively installed on two sides of the rotating shaft mechanism, a first sliding track is disposed on the first base plate, a second sliding track is disposed on the second base plate, the first sliding block is configured to slide in the first sliding track, and the second sliding block is configured to slide in the second sliding track; the rotating shaft mechanism includes a first support transverse beam and a second support transverse beam, and the terminal device further includes a first motor and a second motor; the first motor is fixed to the first base plate, and the second motor is fixed to the second base plate; the first motor includes a first scalable shaft, the first sliding block is connected to the first scalable shaft by using a first fixed pin, the second motor includes a second scalable shaft, and the second sliding block is connected to the second scalable shaft by using a second fixed pin; the first sliding block is connected to the first support transverse beam, and the second sliding block is connected with the second support transverse beam; the first base plate and the second base plate rotate to respectively drive the first support transverse beam and the second support transverse beam to rotate, to respectively drive the first sliding block and the second sliding block to rotate; the first scalable shaft is squeezed or stretched during rotation of the first sliding block, and the first motor controls the first scalable shaft to scale, to drive the first sliding block to slide; and the second scalable shaft is squeezed or stretched during rotation of the second sliding block, and the second motor controls the second scalable shaft to scale, to drive the second sliding block to slide. In some embodiments, sliding control is implemented on the sliding block by using the motor, so that user experience of using the terminal device can be better improved.

In some embodiments, the first sliding block includes a first sliding block hole, the first support transverse beam includes a first transverse beam shaft, and the first transverse beam shaft passes through the first sliding block hole, so that the first sliding block is connected to the first support transverse beam; and the second sliding block includes a second sliding block hole, the second support transverse beam includes a second transverse beam shaft, and the second transverse beam shaft passes through the second sliding block hole, so that the second sliding block is connected to the second support transverse beam.

In some embodiments, the first motor is configured to control a speed of the first scalable shaft based on squeezing or stretching force applied to the first scalable shaft, and the second motor is configured to control a speed of the second scalable shaft based on squeezing or stretching force applied to the second scalable shaft. The speed is controlled to implement well cooperation between sliding of the sliding block and rotation, and this better prevents the flexible panel from being stretched or squeezed.

In some embodiments, the connection mechanism includes a first sliding block and a second sliding block, and the terminal device further includes a first motor and a second motor; the first motor includes a first scalable shaft, and the first sliding block is connected to a tail of the first scalable shaft; the second motor includes a second scalable shaft, and the second sliding block is connected to a tail of the second scalable shaft; the first motor is disposed on the first support component, and the second motor is disposed on the second support component; and the first scalable shaft is configured to scale, and the second scalable shaft is configured to scale.

In some embodiments, a first sliding track is disposed on the first support component, and the first motor is disposed inside the first sliding track.

In some embodiments, a second sliding track is disposed on the second support component, and the second motor is disposed inside the second sliding track.

In some embodiments, the terminal device further includes a first base plate, the first base plate is fixedly connected to the first support component, a first sliding track is disposed on the first base plate, and the first motor is disposed inside the first sliding track.

In some embodiments, the terminal device further includes a second base plate, the second base plate is fixedly connected to the second support component, a second sliding track is disposed on the second base plate, and the second motor is disposed inside the second sliding track.

In some embodiments, the connection mechanism further includes a rotating shaft mechanism, and the first sliding block and the second sliding block are respectively installed on two sides of the rotating shaft mechanism.

The foldable terminal device provided in this embodiment of this application includes the foldable flexible panel, the first support component, the second support component, and the connection mechanism, where the flexible panel includes the first display area, the second display area, and the bending area, and the bending area is located between the first display area and the second display area; the first support component supports the first display area and is fixed to the first display area, and the second support component supports the second display area and is fixed to the second display area; the connection mechanism connects the first support component and the second support component, the connection mechanism is scalable, and the maximum scalable amplitude of the connection mechanism is corresponding to the width of the bending area; and in the process of folding or unfolding the terminal device, at least one of the first support component and the second support component rotates by external force and drives the connection mechanism to scale, the angle by which the at least one of the first support component and the second support component rotates is in the one-to-one correspondence with the scaling displacement of the connection mechanism, and the bending angle of the flexible panel is in the one-to-one correspondence with the displacement of the connection mechanism, to prevent the flexible panel from being stretched or squeezed in the process of folding or unfolding the terminal device.

According to the foldable terminal device provided in this embodiment of this application, because the display area and the bending area are separated, the first display area and the second display area are not affected by bending of the terminal device. In addition, the distance between the connection structure and the first support component and/or the distance between the connection structure and the second support component are/is adjustable. This effectively prevents the flexible panel of the terminal device from being stretched or squeezed by frequent force in the process of folding or unfolding, thereby protecting the flexible panel well and prolonging a service life of the terminal device.

DESCRIPTION OF EMBODIMENTS

The following describes embodiments of this application with reference to the accompanying drawings. Apparently, the described embodiments are merely some rather than all of the embodiments of this application. A person of ordinary skill in the art may learn that as a technology evolves and a new product emerges, the technical solutions provided in the embodiments of this application are also applicable to a similar technical problem.

An embodiment of this application provides a foldable terminal device. A display area and a bending area on a flexible panel of the foldable terminal device are separated, thereby avoiding a problem that the flexible panel slides and a screen function is invalid because the terminal device is folded for a plurality of times. Detailed descriptions are provided below.

Figure 1:
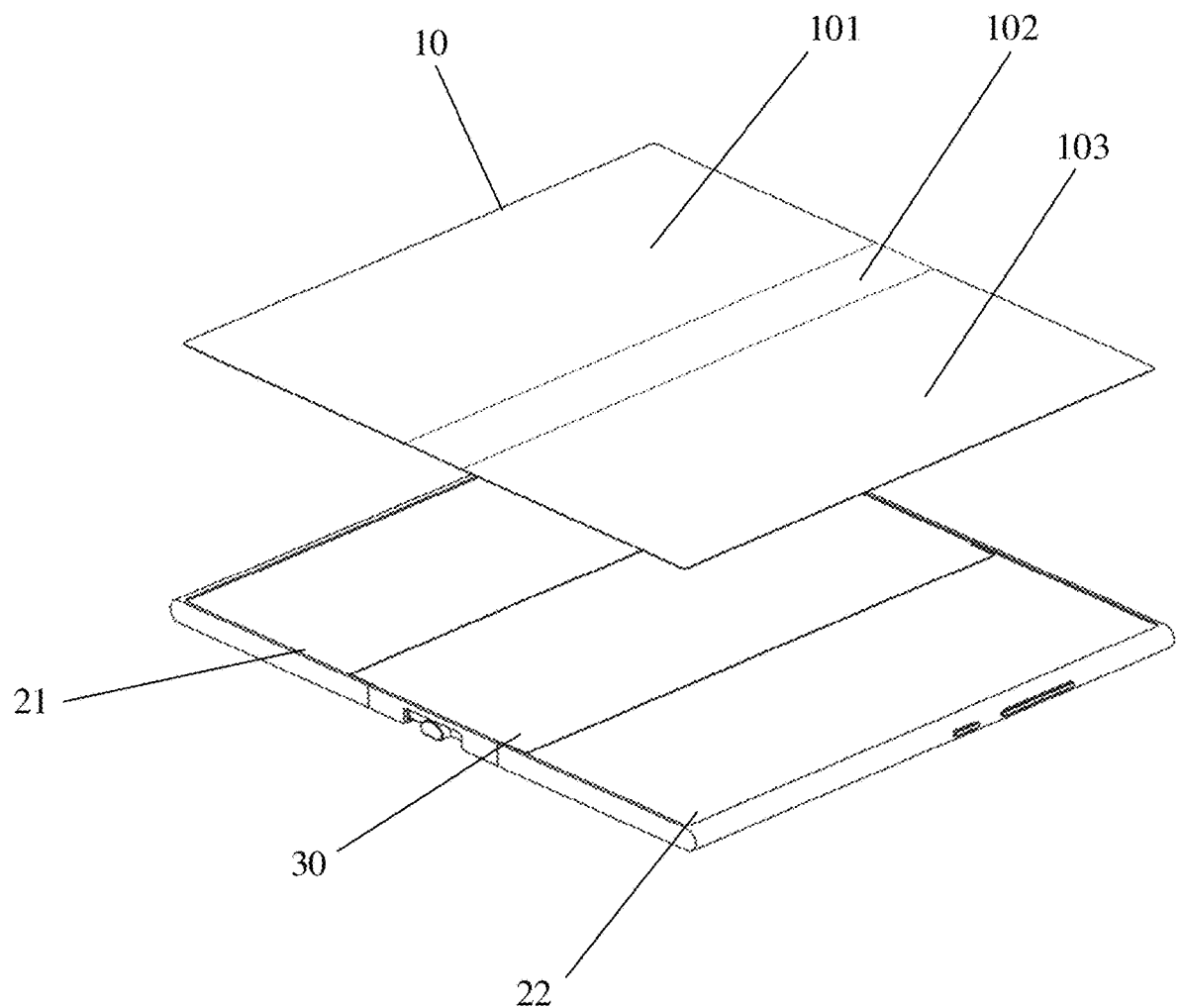
FIG. 1 is a schematic diagram of an embodiment of a foldable terminal device.

FIG. 1 is a schematic diagram of an embodiment of a foldable terminal device according to an embodiment of this application.

As shown in FIG. 1, the foldable terminal device provided in this embodiment of this application includes a foldable flexible panel 10, a first support component 21, a second support component 22, and a connection mechanism 30.

The foldable flexible panel 10 includes a first display area 101, a bending area 102, and a second display area 103, and the bending area 102 is located between the first display area 101 and the second display area 103.

The first support component 21 supports the first display area 101 and is fixed to the first display area 101; and the second support component 22 supports the second display area 103 and is fixed to the second display area 103.

The connection mechanism 30 connects the first support component 21 and the second support component 22, and a distance between the connection mechanism 30 and the first support component 21 or/and a distance between the connection mechanism 30 and the second support component is/are adjustable. The connection mechanism 30 may also be fixed to the bending area 102.

In a process of folding or unfolding, at least one of the first support component 21 and the second support component 22 is driven by an external force to drive the connection mechanism 30 to rotate, to drive the foldable flexible panel 10 to bend at different angles as the connection mechanism 30 rotates. In other words, the at least one of the first support component 21 and the second support component 22 rotates by the external force, and drives the connection mechanism 30 to rotate, to drive the foldable flexible panel 10 to bend at different angles as the connection mechanism 30 rotates.

The connection mechanism connects the first support component and the second support component, the connection mechanism is scalable, and a maximum scalable amplitude of the connection mechanism is corresponding to a width of the bending area. Specifically, the width of the connection mechanism is a minimum distance between the first support component and the second support component when the terminal device is fully unfolded.

In a process of folding or unfolding the terminal device, at least one of the first support component and the second support component rotates by external force and drives the connection mechanism to scale, an angle by which the at least one of the first support component and the second support component rotates is in a one-to-one correspondence with a scaling displacement of the connection mechanism, and a bending angle of the foldable flexible panel is in a one-to-one correspondence with the scaling displacement of the connection mechanism, to prevent the flexible panel from being stretched or squeezed in the process of folding or unfolding the terminal device.

The distance between the first support component 21 or the second support component 22 and the connection mechanism 30 is adjustable, and the flexible panel 10 is not stretched or squeezed in the process of folding or unfolding the terminal device, so that the foldable flexible panel 10 can be protected well. In addition, the distance is usually comparatively short and is covered by a housing of the terminal device, and therefore aesthetics of the terminal device is not affected. The distance is not explicitly marked in the figure.

It can be learned that in this embodiment of this application, the display area and the bending area on the foldable flexible panel are separated, the connection mechanism is scalable, and the maximum scalable amplitude of the connection mechanism is corresponding to the width of the bending area. Specifically, the width of the connection mechanism is the minimum distance between the first support component and the second support component when the terminal device is fully unfolded.

In the process of folding or unfolding the terminal device, the at least one of the first support component and the second support component rotates by the external force and drives the connection mechanism to scale, the angle by which the at least one of the first support component and the second support component rotates is in the one-to-one correspondence with the scaling displacement of the connection mechanism, and the bending angle of the flexible panel is in the one-to-one correspondence with the scaling displacement of the connection mechanism, to prevent the foldable flexible panel from being stretched or squeezed in the process of folding or unfolding the terminal device.

This effectively prevents the foldable flexible panel of the terminal device from being stretched or squeezed by frequent force in the process of folding or unfolding, thereby protecting the flexible panel well and prolonging a service life of the terminal device.

The foldable flexible panel is disposed on an outer surface of the terminal device, the foldable flexible panel 10 may be fixed to the first support component 21, the connection mechanism 30, and the second support component 22 by using an adhesive, and the adhesive is a bonding material such as a pressure-sensitive tape or a thermal pressure adhesive film that has comparatively good extensibility.

Figure 2A:
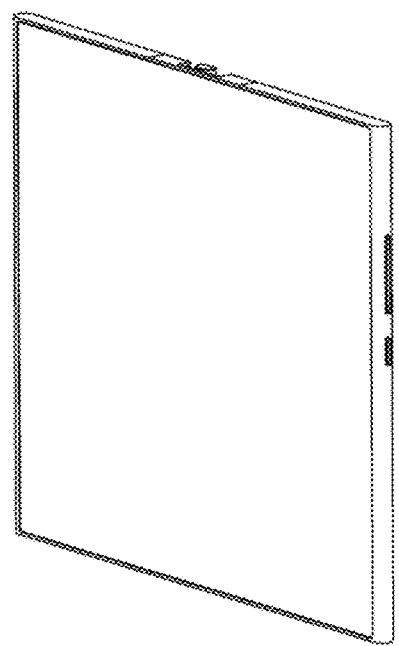
FIG. 2A is a schematic diagram of an unfolded state of a foldable terminal device.
Figure 2B:
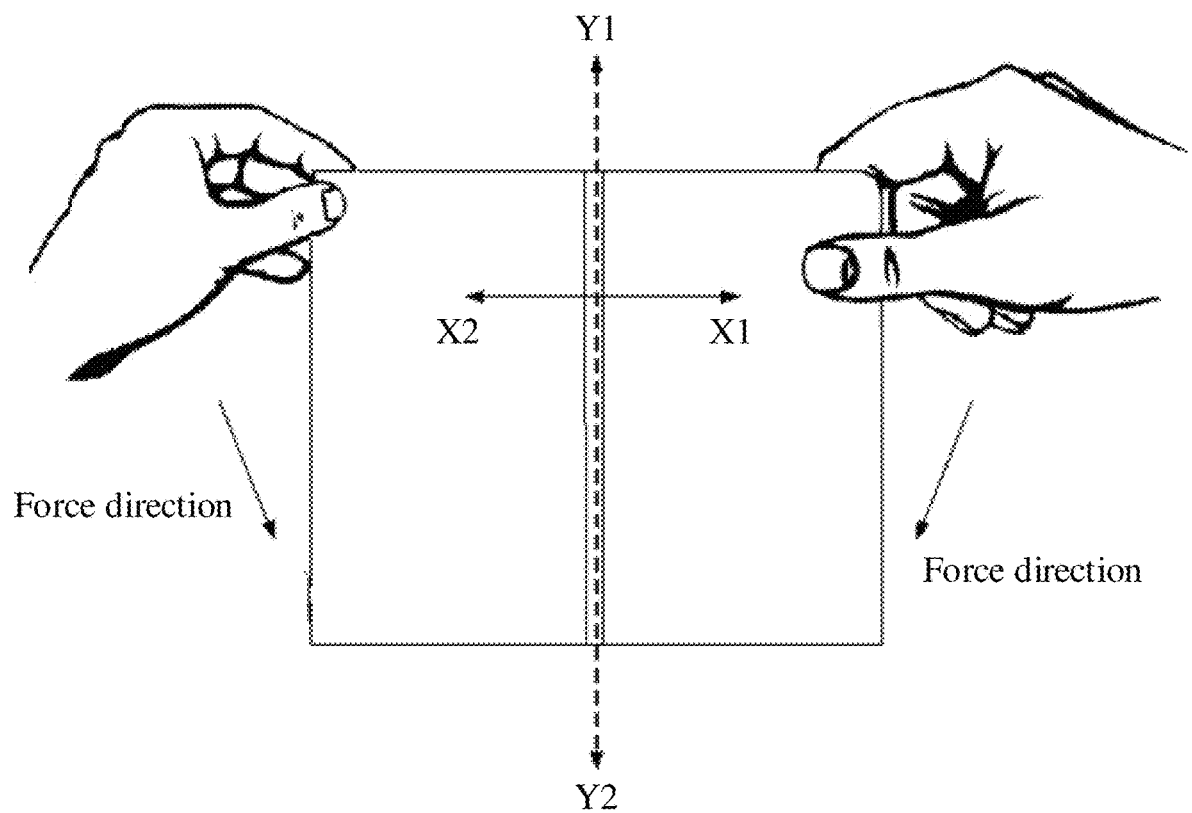
FIG. 2B is a schematic diagram of folding a foldable terminal device by force according to an embodiment of this application.
Figure 2C:
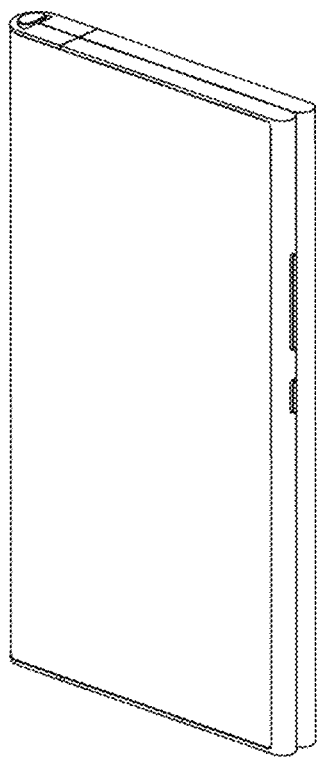
FIG. 2C is a schematic diagram of a folding state of a foldable terminal device according to an embodiment of this application.

FIG. 2A, FIG. 2B, and FIG. 2C are respectively schematic diagrams of an unfolded state, folding by force, and a folded state of a foldable terminal device according to an embodiment of this application.

As shown in FIG. 2A, the foldable terminal device in the unfolded state is a tablet. When the foldable terminal device is to be folded, as shown in FIG. 2B, the foldable terminal device bears external force, bends inwards, and finally reaches the folding state shown in FIG. 2C. On a contrary, the foldable terminal device switches from the folding state to the unfolded state when bearing outwards opening force, and is unfolded from the folding state shown in FIG. 2C to the unfolded state shown in FIG. 2A.

In FIG. 2B, a straight line on which a line indicated by Y1Y2 is located is a straight line on which a rotation shaft is located. In a process of folding the terminal device, the first display area 101 or the second display area 103 or the first support component 21 or the second support component 22 rotates around the rotation shaft.

Figure 3A:
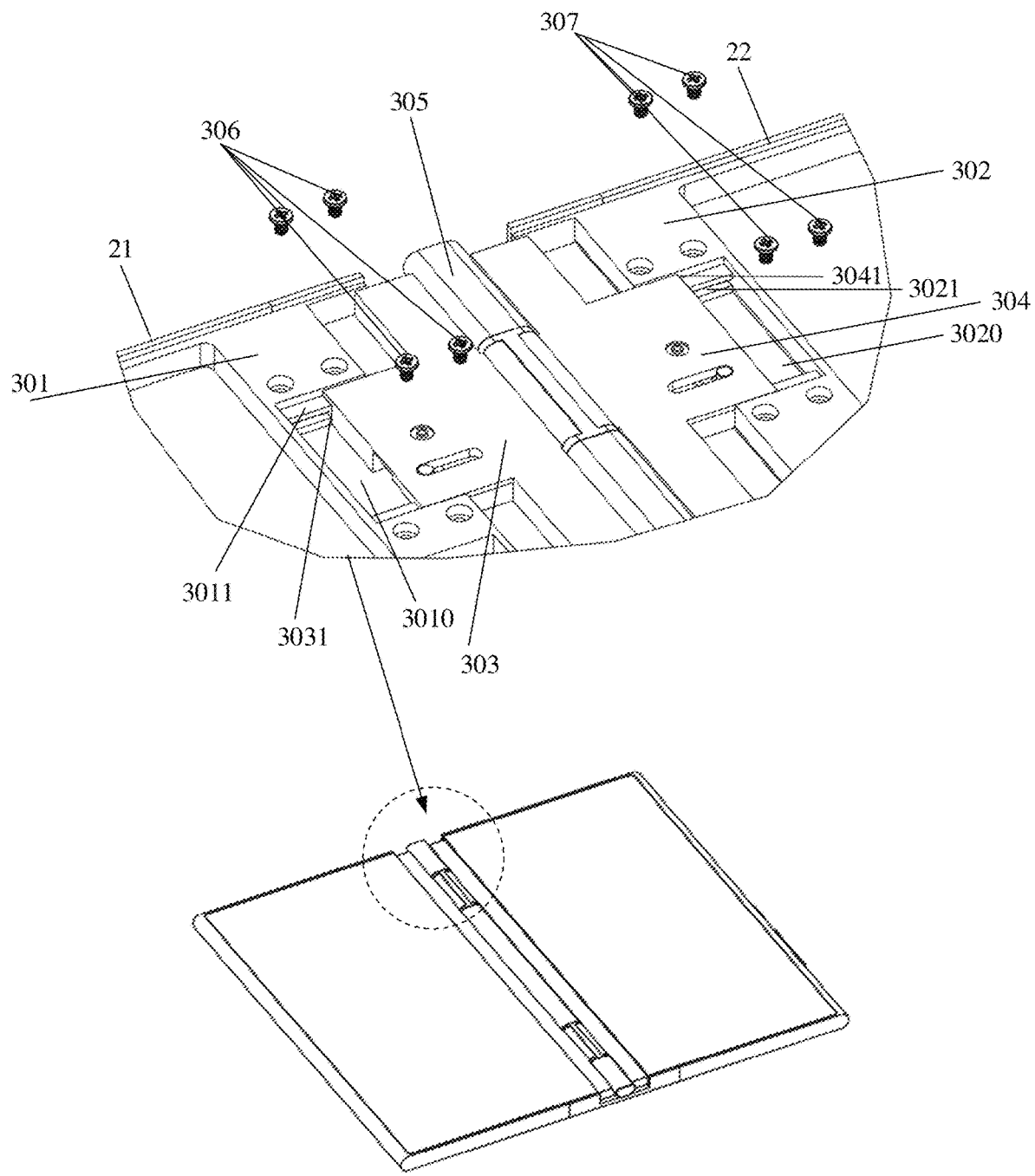
FIG. 3A is a partial cross-sectional view of a connection structure according to an embodiment of this application.

For a connection relationship between the connection mechanism 30 and the first support component 21 and a connection relationship between the connection mechanism 30 and the second support component 22, refer to FIG. 3A for understanding.

The connection mechanism 30 includes a first base plate 301, a second base plate 302, a first sliding block 303, a second sliding block 304, and a rotating shaft mechanism 305. In a process of unfolding the terminal device, at least one of the first support component 21 and the second support component 22 rotates by external force, and drives the first sliding block 303 and the second sliding block 304 to slide in a direction away from each other. In a process of folding the terminal device, at least one of the first support component 21 and the second support component 22 rotates by external force, and drives the first sliding block 303 and the second sliding block 304 to slide in a direction close to each other. In a process of folding or unfolding the terminal device, the first sliding block and the second sliding block slide in a cooperation manner, so that folding or unfolding can be conveniently performed. This can effectively reduce stretching and squeezing on a foldable flexible screen.

In the process of folding or unfolding the terminal device, a first displacement generated by sliding of the first sliding block 303 is corresponding to a first angle by which the first support component 21 rotates, and a second displacement generated by sliding of the second sliding block 304 is corresponding to a second angle by which the second support component 22 rotates. That the displacement is corresponding to the angle in this embodiment of this application may be a one-to-one correspondence between the displacement generated by sliding and the angle generated by rotating. To be specific, the displacement generated by sliding of the first sliding block 303 is totally used to rotate the first support component 21, to generate the first angle, and the displacement generated by sliding of the second sliding block 304 is totally used to rotate the second support component 22, to generate the second angle. The displacement generated by sliding of the sliding block is corresponding to the angle by which the support component rotates. Effective cooperation between rotation and sliding is implemented, and the flexible panel is not stretched or squeezed during rotation.

Figure 3B:
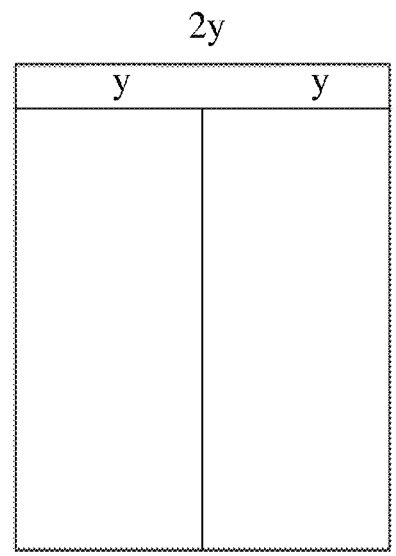
FIG. 3B is a schematic diagram of an example of a sliding displacement of a sliding block according to an embodiment of this application.
Figure 3C:
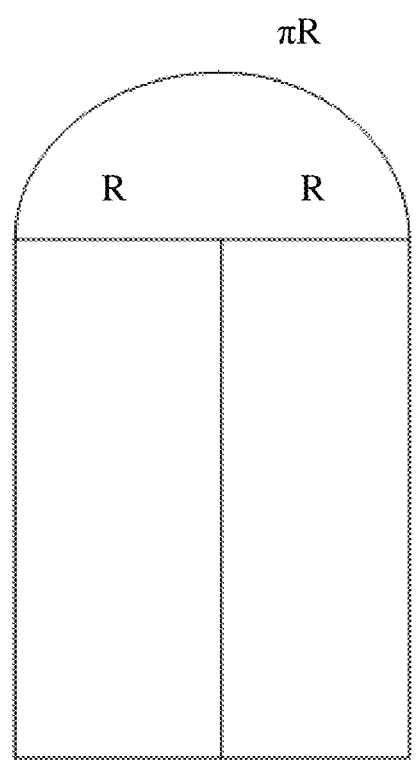
FIG. 3C is a schematic diagram of an example of a path along which a terminal device rotates according to an embodiment of this application.
Figure 3D:
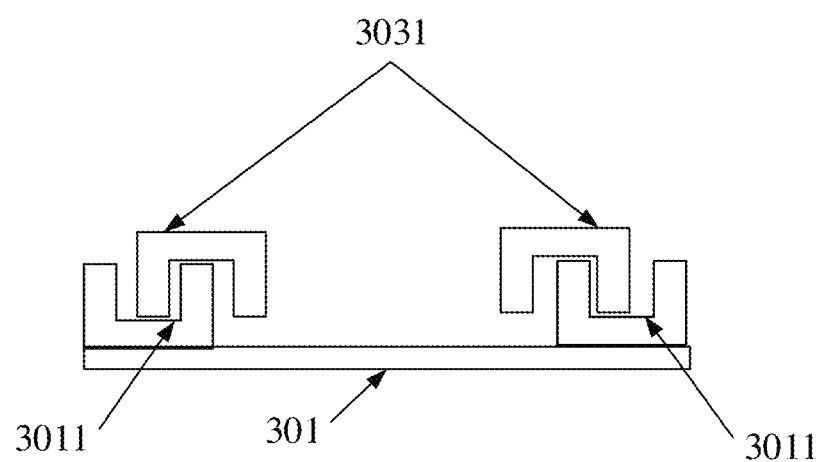
FIG. 3D is a schematic structural diagram of a sliding rail and a sliding slot.

For the first displacement and the second displacement, refer to FIG. 3B for understanding. Both the first displacement and the second displacement shown in FIG. 3B are y. The first angle and the second angle generated from folding to unfolding or from unfolding to folding range from 0 to 90 degrees. As shown in FIG. 3C, in a process of folding, a half of a length in a horizontal direction of the terminal device is used as a radius R, and when the terminal device is unfolded from 0 to 90 degrees, a total length of an arc passed through by unfolding two sides of the terminal is exactly a half of a circumference, that is, $\pi R$. The maximum scalable amplitude of the connection mechanism is corresponding to the width of the bending area, and the width of the connection mechanism is the minimum distance between the first support component and the second support component when the terminal device is fully unfolded.

Alternatively, after a start displacement is generated when at least one of the first sliding block 303 and the second sliding block 304 slides, the flexible panel rotates with the first support component 21 and the second support component 22, and the start displacement is greater than or equal to an amplitude of shrinking or stretching of the flexible panel when the foldable flexible panel rotates. This can implement pre-adjustment. The first sliding block 303 and the second sliding block 304 are prepared in advance for the displacement before the flexible panel rotates, thereby avoiding stretching or shrinking of the foldable flexible panel and effectively avoiding sliding of the flexible panel on the support component.

In the foregoing embodiment, the width of the bending area 102 falls within a value range (D, D+a) including a sum of a thickness of the first support component 21 and a thickness of the second support component 22, where D represents the sum of the thickness of the first support component 21 and the thickness of the second support component 22, a represents an offset value, and a is greater than 0. In other words, the width of the bending area 102 is greater than D; or a thickness of an adhesive may be added, and greater than the thickness of the adhesive. The width of the bending area 102 meets this condition. In the folding state, the foldable flexible panel between the first display area and the second display area does not need to be stretched, and in particular, a wrinkle generated by stretching or squeezing the bending area of the flexible panel is avoided in the process of folding or unfolding the terminal device, so that the flexible panel can be protected well.

A sum of a sliding distance of the first sliding block 303 and a sliding distance of the second sliding block 304 is greater than or equal to the width of the bending area 102. In other words, in the process of unfolding, the first sliding block 303 and the second sliding block 304 slide out of the bending area, so that the bending area 102 can more conveniently rotate with the first support component 21 and the second support component 22, and the flexible panel of the bending area 102 is not stretched; or in the process of folding, the flexible panel of the bending area 102 is prevented from being squeezed, thereby protecting the flexible panel well.

Among the first base plate 301, the second base plate 302, the first sliding block 303, the second sliding block 304, and the rotating shaft mechanism 305, the first base plate 301 is connected to the first support component 21 by using a first fastener 306, and the second base plate 302 is connected to the second support component 22 by using a second fastener 307.

The first sliding block 303 and the second sliding block 304 are respectively installed on two sides of the rotating shaft mechanism 305.

In the process of folding or unfolding, the first support component 21 and the second support component 22 respectively drive the first base plate 301 and the second base plate 302 to rotate, and the first sliding block 303 and the second sliding block 304 rotate around the rotating shaft mechanism 305 respectively under the driving of the first base plate 301 and the second base plate 302.

As shown in FIG. 3A, a first sliding track 3010 is disposed on the first base plate 301, and a second sliding track 3020 is disposed on the second base plate 302. The first sliding block 303 can slide in the first sliding track 3010, and the second sliding block 304 can slide in the second sliding track 3020.

In the process of folding or unfolding the terminal device, the first sliding block 303 slides in the first sliding track 3010, and the second sliding block 304 slides in the second sliding track 3020. This can effectively reduce stretching and squeezing on the foldable flexible screen.

A sliding direction of the first sliding block 303 in the first sliding track 3010 may be a direction substantially perpendicular to the rotation shaft, and a sliding direction of the second sliding block 304 in the second sliding track 3020 may be a direction substantially perpendicular to the rotation shaft.

An extension direction of the first sliding track 3010 may be a direction substantially perpendicular to the rotation shaft; and an extension direction of the second sliding track 3020 may be a direction substantially perpendicular to the rotation shaft.

The first sliding track 3010 has two opposite ends, one end is close to the rotation shaft, and the other end is away from the rotation shaft. The second sliding track 3020 has two opposite ends, one end is close to the rotation shaft, and the other end is away from the rotation shaft.

The first sliding track 3010 may alternatively be disposed on the first support component 21, so that the first base plate 301 does not need to be disposed. The second sliding track 3020 may alternatively be disposed on the second support component 22, so that the second base plate 302 does not need to be disposed. In this way, the connection mechanism 30 may include neither the first base plate 301 nor the second base plate 302.

When the first base plate 301 and the second base plate 302 are disposed, the first support component 21 may be fixedly connected to the first base plate 301 in any manner. The second support component 22 may be fixedly connected to the second base plate 302 in any manner.

A first sliding rail 3031 is disposed on the first sliding block 303, and a first sliding slot 3011 is disposed on the first base plate 301; and a second sliding rail 3041 is disposed on the second sliding block 304, and a second sliding slot 3021 is disposed on the second base plate 302.

The first sliding block 303 and the first base plate 301 are movably connected by using the first sliding rail 3031 and the first sliding slot 3011, and the second sliding block 304 and the second base plate 302 are movably connected by using the second sliding rail 3041 and the second sliding slot 3021.

When the first sliding block 303 and the second sliding block 304 rotate around the rotating shaft mechanism 305, the first sliding rail 3031 slides in the first sliding slot 3011 within an adjustable distance between the first support component 21 and the connection mechanism 30, and the second sliding rail 3041 slides in the second sliding slot 3021 within an adjustable distance between the second support component 22 and the connection mechanism 30.

FIG. 3B is a schematic structural diagram of a sliding rail and a sliding slot. The first sliding rail 3031 is a first groove structure whose bottom plate is fixed on the first sliding block 303, the first sliding slot 3011 is also a second groove structure whose bottom plate is fixed on the first base plate 301, and a side wall of the second groove structure is embedded into the first groove structure. It should be noted that the sliding rail and the sliding slot in this embodiment of this application have many variation structures, and a specific structural form is not limited in this application provided that the sliding rail can slide in the sliding slot. In this way, the first support component 21 and the second support component 22 can generate a scaling displacement in a process of bending around the rotating shaft mechanism 305.

A folding principle of the foldable terminal device provided in this embodiment of this application may be implemented in a mechanical manner, or may be implemented by using a motor. Content implemented in the mechanical manner is described below with reference to the accompanying drawings.

Figure 4:
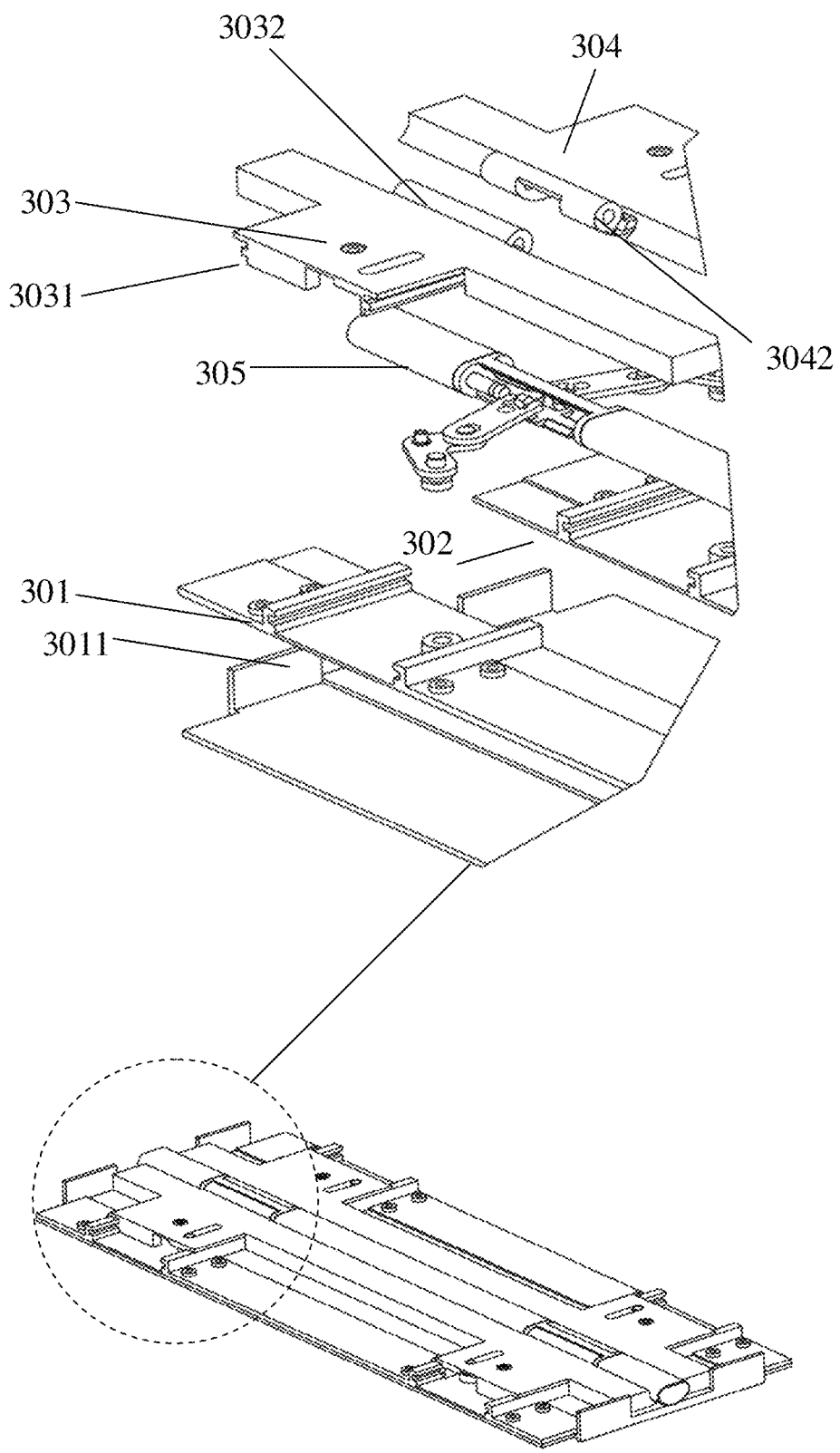
FIG. 4 is an exploded view of a connection structure according to an embodiment of this application.

As shown in FIG. 4, an exploded view of a connection mechanism 30 includes a first base plate 301, a second base plate 302, a first sliding block 303, and a second sliding block 304. Sliding rails on the first sliding block are collectively referred to as a first sliding rail 3031, there may be two first sliding rails, and certainly a quantity of the first sliding rails may not be limited. Sliding slots on the first base plate 301 are collectively referred to as a first sliding slot 3011, and a quantity of the first sliding slots 3011 matches the quantity of the first sliding rails 3031. Similarly, sliding slots on the second base plate 302 are collectively referred to as a second sliding slot 3021, and sliding rails on the second sliding block 304 are collectively referred to as a second sliding rail 3041. A quantity of the second sliding rails 3041 matches a quantity of the second sliding slots. The first sliding block 303 further includes a first irregular hole 3032, and the second sliding block further includes a second irregular hole 3042.

Figure 5A:
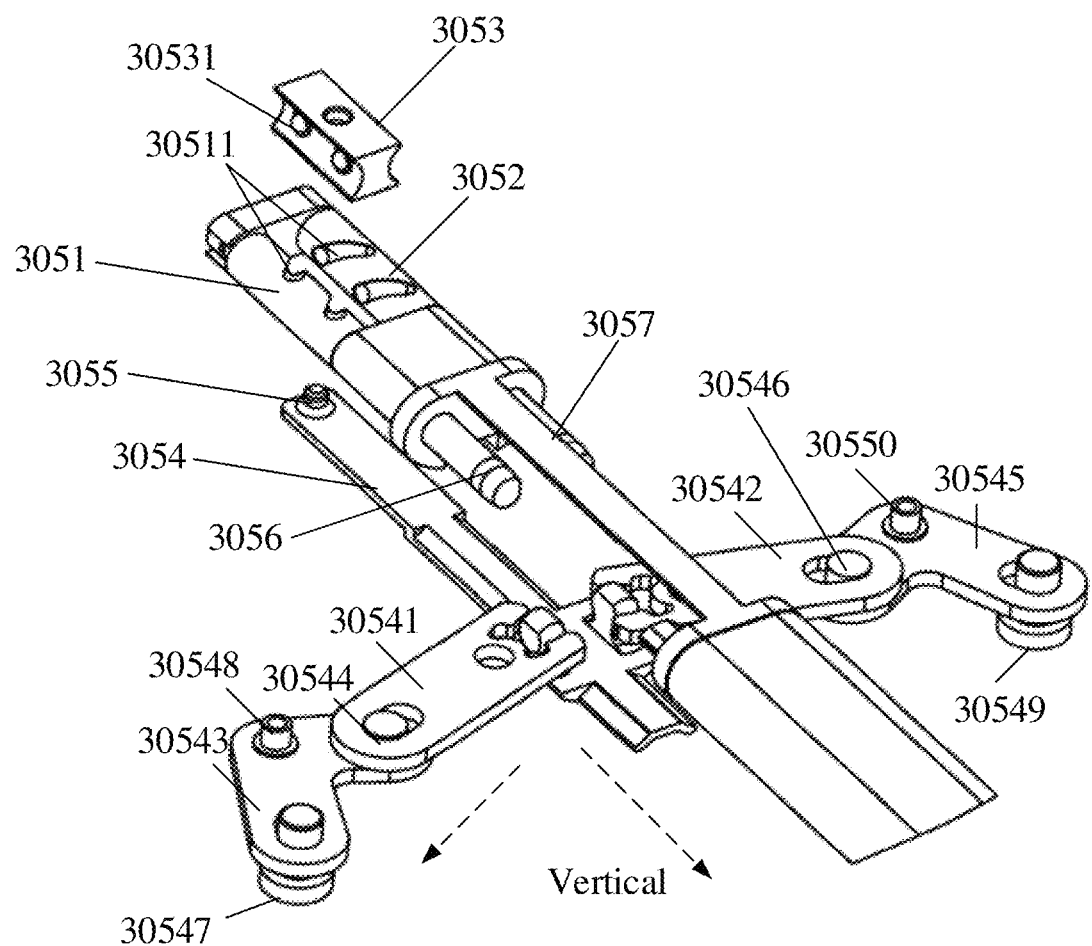
FIG. 5A is a schematic separation diagram of a rotating shaft mechanism according to an embodiment of this application.
Figure 5B:
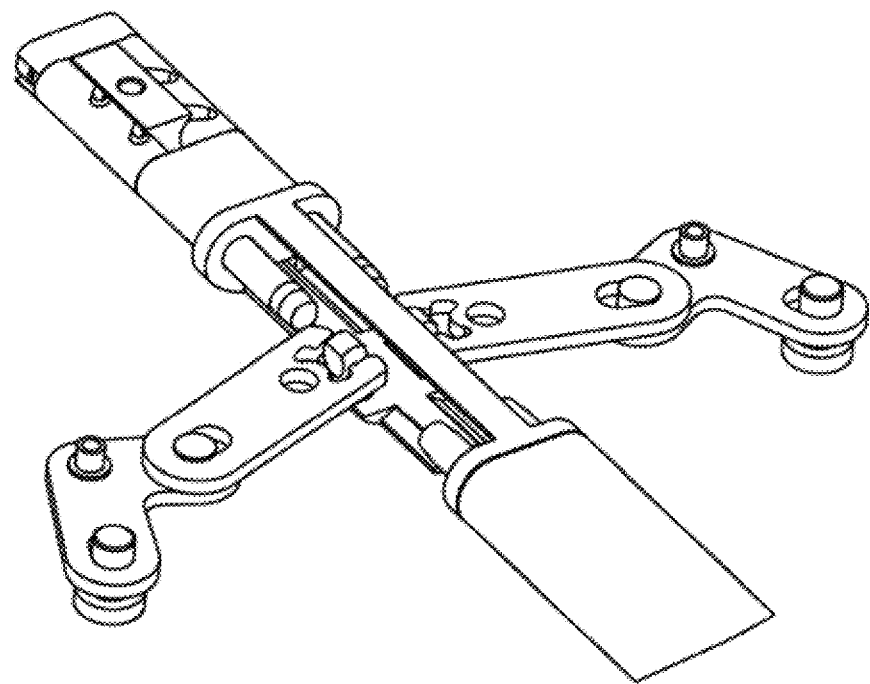
FIG. 5B is a schematic assembly diagram of a rotating shaft mechanism according to an embodiment of this application.

For understanding of a rotating shaft mechanism 305, refer to a separation diagram of a rotating shaft mechanism shown in FIG. 5A and an assembly diagram of a rotating shaft mechanism shown in FIG. 5B. As shown in FIG. 5A, the rotating shaft mechanism 305 includes a first rotating shaft 3051, a second rotating shaft 3052, a push block 3053, and a push rod 3054, where a rotating shaft sliding slot 30511 is disposed on each of the first rotating shaft 3051 and the second rotating shaft 3052, and convex hulls 30531 are disposed on the push block 3053. The push block 3053 and the push rod 3054 are connected by using a first connecting piece 3055.

A first connecting rod 30541 and a second connecting rod 30542 are installed on the push rod 3054, the first connecting rod 30541 and a third connecting rod 30543 are movably connected by using a second connecting piece 30544, and the second connecting rod 30542 and a fourth connecting rod 30545 are movably connected by using a third connecting piece 30546.

The third connecting rod 30543 is connected to the first base plate 301 by using a fourth connecting piece 30547, the third connecting rod 30543 is connected to the first sliding block 303 by using a fifth connecting piece 30548, the fourth connecting rod 30545 is connected to the second base plate 302 by using a sixth connecting piece 30549, and the fourth connecting rod 30545 is connected to the second sliding block 304 by using a seventh connecting piece 30550.

The first base plate 301 and the second base plate 302 respectively drive the first rotating shaft 3051 and the second rotating shaft 3052 to rotate, and the convex hulls 30531 on the push block 3053 slide in the rotating shaft sliding slot 30511, so that the push block 3053 drives the push rod 3054 to slide in a vertical direction; the push rod 3054 drives the first connecting rod 30541 and the second connecting rod 30542 to slide in a vertical direction; and the first connecting rod 30541 drives the third connecting rod 30543 to rotate, the third connecting rod 30543 rotates to drive the first sliding block 303 to slide on the first base plate 301, the second connecting rod 30542 drives the fourth connecting rod 30545 to rotate, and the fourth connecting rod 30545 drives the second sliding block 304 to slide on the second base plate 302.

The first sliding block 303 includes a first irregular hole 3032, the rotating shaft mechanism 305 includes a first irregular shaft 3056, and the first irregular shaft 3056 passes through the first irregular hole 3032, so that the first sliding block 303 is connected to the rotating shaft mechanism 305.

The second sliding block 304 includes a second irregular hole 3042, the rotating shaft mechanism 305 includes a second irregular shaft 3057, and the second irregular shaft 3057 passes through the second irregular hole 3042, so that the second sliding block 304 is connected to the rotating shaft mechanism 305.

The first rotating shaft 3051 and the second rotating shaft 3052 are respectively used as centers of an adjustable distance between the connection mechanism 30 and a first support component 21 and an adjustable distance between the connection mechanism 30 and a second support component 22. The first rotating shaft 3051 and the second rotating shaft 3052 are used as a vertical axis of a coordinate system, the adjustable distance between the connection mechanism 30 and the first support component 21 is used as a horizontal axis on one side, and the adjustable distance between the connection mechanism 30 and the second rotating shaft 3052 is used as a horizontal axis on the other side. If a distance on only one side is adjustable, only a coordinate system on the one side of the vertical axis needs to be used for understanding.

Figure 6:
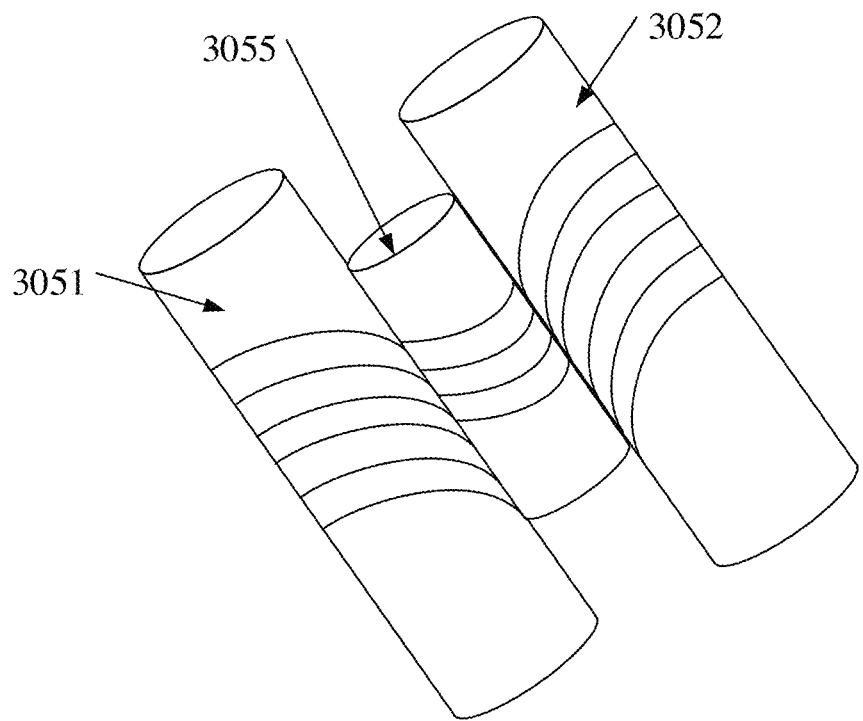
FIG. 6 is a schematic structural diagram of an example of a rotating shaft mechanism.

FIG. 6 is a schematic structural diagram of an example of a rotating shaft mechanism. The rotating shaft mechanism 305 includes a first rotating shaft 3051, a second rotating shaft 3052, and a push component 3055 disposed between the first rotating shaft 3051 and the second rotating shaft 3052. A first screw thread is provided on an outer wall of the first rotating shaft 3051, a second screw thread is provided on an outer wall of the second rotating shaft 3052, and a third screw thread is provided on an outer wall of the push component 3055. Both the first screw thread and the second thread match and but against the third screw thread, so that in a process in which the first rotating shaft 3051 and the second rotating shaft 3052 rotate, the push component 3055 moves in a radial direction of the rotating shaft.

Figure 7A:
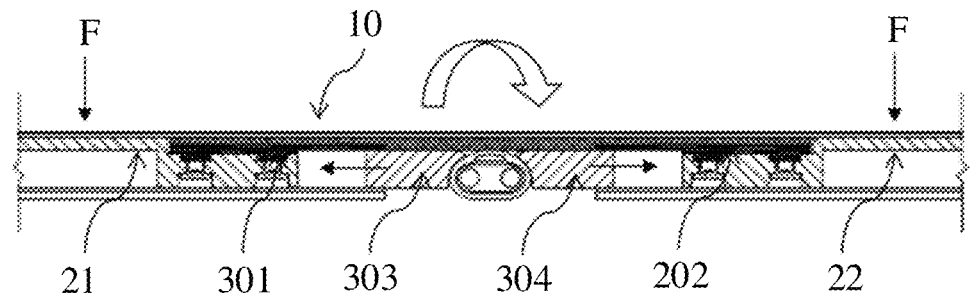
FIG. 7A is a schematic force-bearing diagram of a terminal device in an unfolded state according to an embodiment of this application.
Figure 7B:
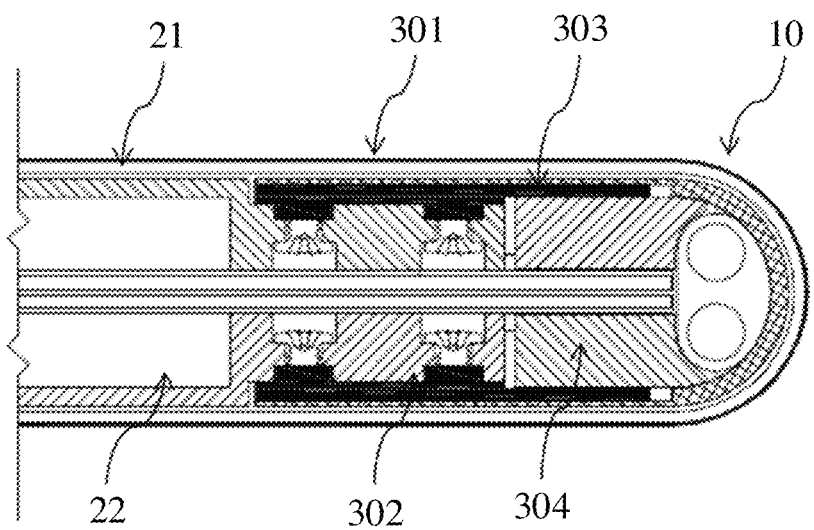
FIG. 7B is another schematic diagram of a folded terminal device according to an embodiment of this application.

A cross-sectional view of the foregoing terminal device with a mechanical structure in an unfolded state is shown in FIG. 7A. A first support component 21 is connected to a first base plate 301, the first base plate 301 cooperates with a first sliding block 303, a second support component 22 is connected to a second base plate 302, and the second base plate 302 cooperates with a second sliding block 304. When the terminal device bears inwards-folded external force, the components cooperate with each other to rotate, to reach a folding state shown in FIG. 7B.

Figure 8:
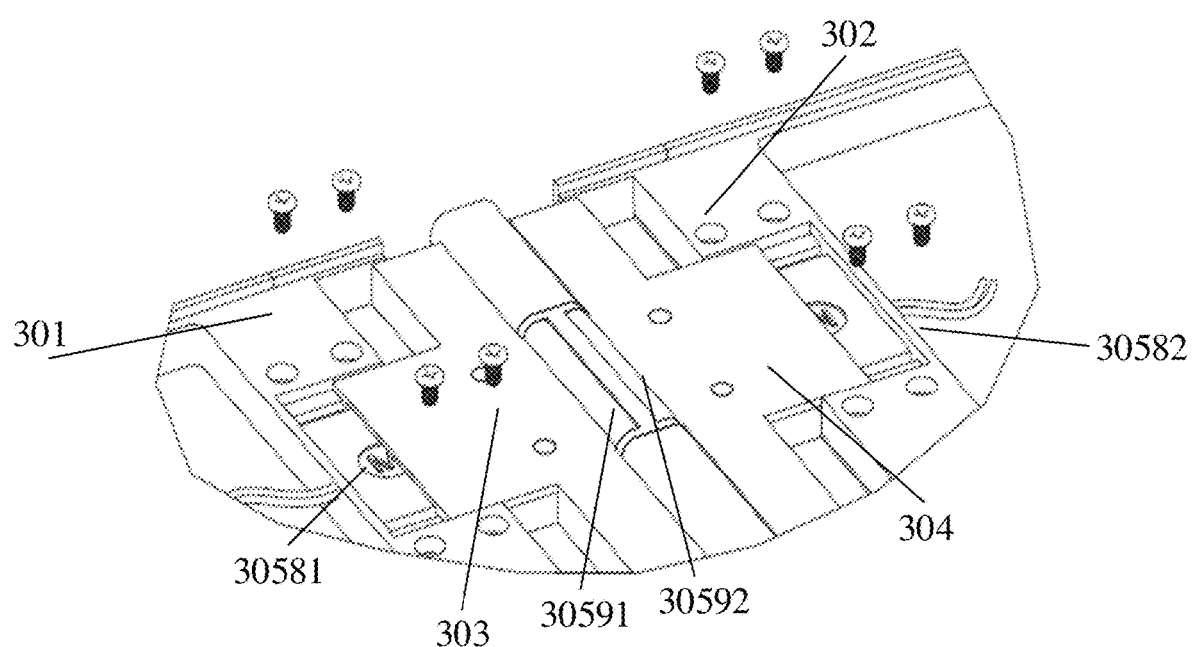
FIG. 8 is another partial cross-sectional view of a connection structure according to an embodiment of this application.

Another rotating shaft mechanism implemented by using a motor in a foldable solution is shown in FIG. 8. The rotating shaft mechanism 305 includes a first support transverse beam 30591 and a second support transverse beam 30592, and the terminal device includes a first motor 30581 and a second motor 30582. The first motor 30581 is fixed to a first base plate 301, and the second motor 30582 is fixed to a second base plate 302.

Figure 9:
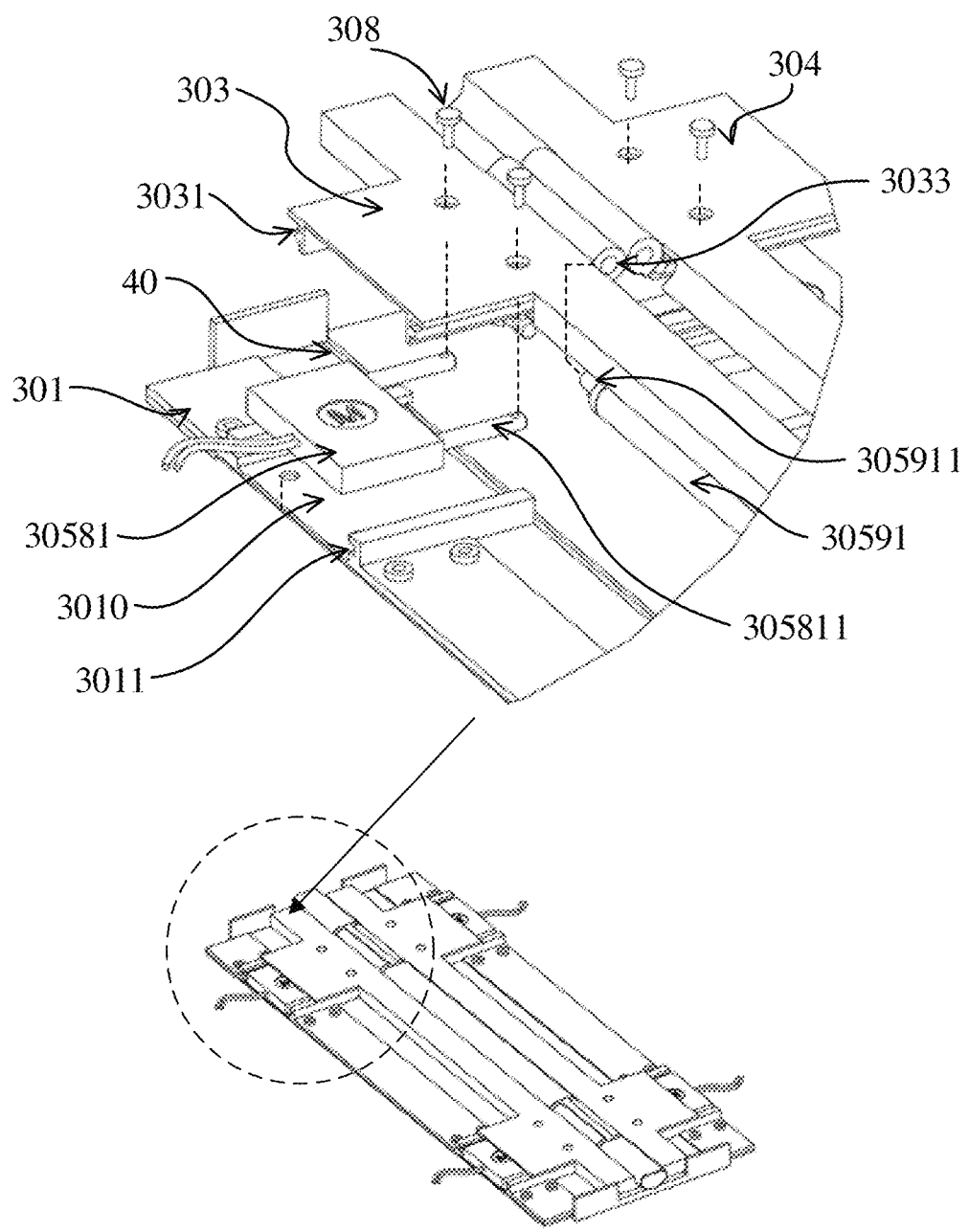
FIG. 9 is another exploded view of a connection structure according to an embodiment of this application.

FIG. 9 is an exploded view of a connection structure. As shown in FIG. 9, a first motor 30581 includes a first scalable shaft 305811, a first sliding block 303 is connected to the first scalable shaft 305811 by using a first fixed pin 308, the second motor 30582 includes a second scalable shaft, and a second sliding block is connected to the second scalable shaft by using a second fixed pin.

The first sliding block 303 may be connected to a tail of the first scalable shaft 305811. The first sliding block 303 and the first scalable shaft 305811 may alternatively be connected in another manner provided that the first sliding block 303 can limit a scaling direction of the first scalable shaft 305811 when the first scalable shaft 305811 scales. The second sliding block 304 may be connected to a tail of the second scalable shaft. The second sliding block 304 and the second scalable shaft may alternatively be connected in another manner provided that the second sliding block 304 can limit a scaling direction of the second scalable shaft when the second scalable shaft scales.

In a process of folding or unfolding the terminal device, the first scalable shaft 305811 and the second scalable shaft scale, to respectively drive the first base plate and the second base plate to rotate (or drive the first support component 21 and the second support component 22 to rotate), to drive the screen to bend, thereby effectively reducing stretching and squeezing on the foldable flexible screen. In a fully folded state of the flexible screen, the first scalable shaft 305811 and the second scalable shaft are stretched to a maximum length. In a fully unfolded state of the flexible screen, the first scalable shaft 305811 and the second scalable shaft are shrunk to a minimum length. The flexible screen may be fixed in a half-folded state when a length of the first scalable shaft 305811 or the second scalable shaft is fixed between the minimum length and the maximum length. Specifically, fixing the flexible screen at a folding angle may be implemented by adjusting a scaling length of the first scalable shaft 305811 or the second scalable shaft.

As shown in FIG. 9, when the first sliding track 3010 is disposed, the first motor 30581 may be disposed inside the first sliding track 3010. For example, the first motor 30581 may be disposed at an end, away from the rotation shaft, of the first sliding track 3010. When the second sliding track 3020 is disposed, the second motor 30582 may be disposed inside the second sliding track 3020. For example, the second motor 30582 may be disposed at an end, away from the rotation shaft, of the second sliding track 3020.

Alternatively, the first sliding track 3010 may not be disposed, so that the first motor 30581 may not be disposed in the sliding track, but is disposed on a surface of the first base plate 301. When the first base plate 301 is not disposed, the first motor 30581 may be disposed on a surface of the first support component 21.

Alternatively, the second sliding track 3010 may not be disposed, so that the second motor 30582 may not be disposed in the sliding track, but is disposed on a surface of the second base plate 302. When the second base plate 302 is not disposed, the second motor 30582 may be disposed on a surface of the second support component 22.

The first sliding block 303 is connected to the first support transverse beam, and the second sliding block 304 is connected to the second support transverse beam. The first base plate 301 and the second base plate 302 rotate to respectively drive the first support transverse beam 30591 and the second support transverse beam 30592 to rotate, to respectively drive the first sliding block 303 and the second sliding block 304 to rotate.

The first scalable shaft 305811 is squeezed or stretched during rotation of the first sliding block 303, and the first motor 30581 controls the first scalable shaft to scale, to drive the first sliding block 303 to slide; and the second scalable shaft is squeezed or stretched during rotation of the second sliding block 304, and the second motor controls the second scalable shaft to scale, to drive the second sliding block to slide.

The first sliding block 303 includes a first sliding block hole 3033, the first support transverse beam 30591 includes a first transverse beam shaft 305911, and the first transverse beam shaft 305911 passes through the first sliding block hole 3033, so that the first sliding block 303 is connected to the first support transverse beam 30591.

The second sliding block includes a second sliding block hole, the second support transverse beam includes a second transverse beam shaft, and the second transverse beam shaft passes through the second sliding block hole, so that the second sliding block is connected to the second support transverse beam.

The first motor controls a speed of the first scalable shaft based on squeezing or stretching force applied to the first scalable shaft, and the second motor controls a speed of the second scalable shaft based on squeezing or stretching force applied to the second scalable shaft.

Figure 10A:
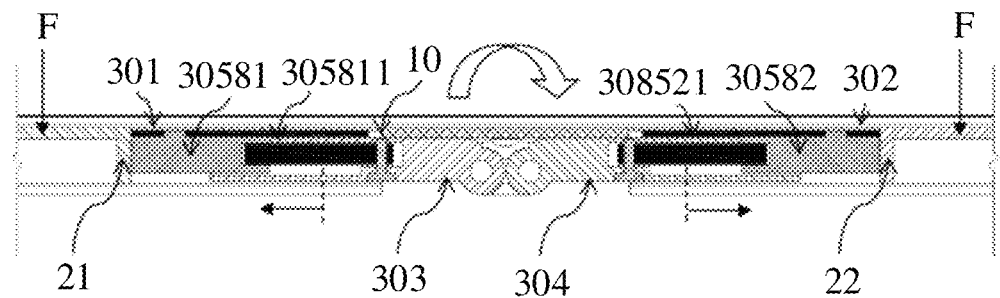
FIG. 10A is still another schematic force-bearing diagram of a terminal device in an unfolded state according to an embodiment of this application.
Figure 10B:
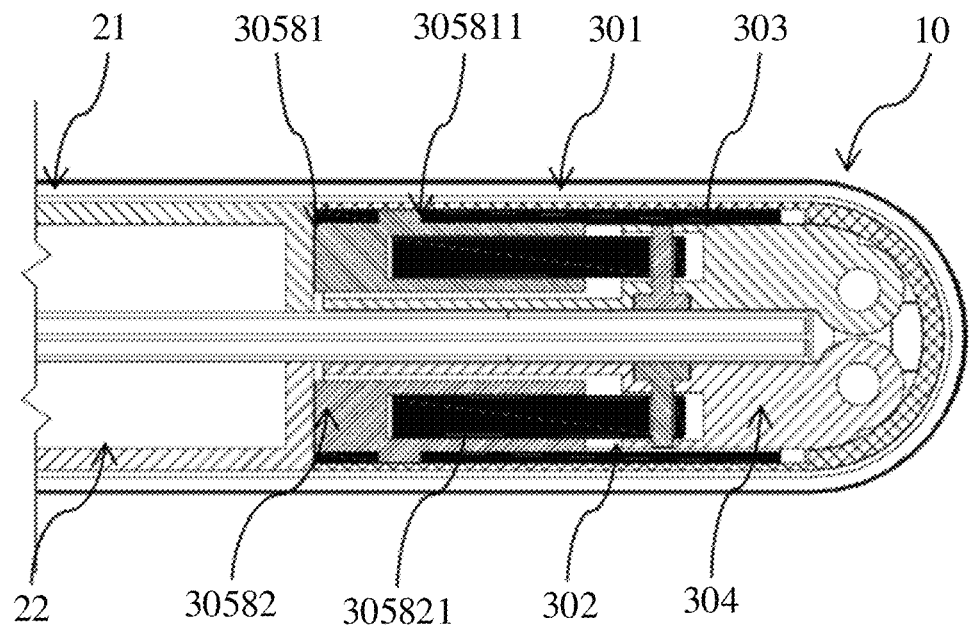
FIG. 10B is still another schematic diagram of a folded terminal device according to an embodiment of this application.

A cross-sectional view of the terminal device with a motor structure in an unfolded state is shown in FIG. 10A. A first support component 21 is connected to a first base plate 301, and a first motor 30581 pulls, through scaling of a first scalable shaft 305811, a first sliding block 303 to slide. A second support component 22 is connected to a second base plate 302, and a second motor 30582 pulls, through scaling of a second scalable shaft 305821, a second sliding block 304 to slide. When the terminal device bears inwards-folded external force, the components cooperate with each other to rotate, to reach a folding state shown in FIG. 10B.

In this embodiment of this application, in a process of unfolding or folding the foldable mobile terminal, because a bending angle of the bending area is in a one-to-one correspondence with a stretching displacement or a shrinking displacement of the sliding block, a relative distance between the rotating shaft and the base plate is increased or decreased by using a transverse stretching displacement of the sliding block. In a process of folding, widths of the first support plate and the second support plate of the mobile terminal cancel the displacement of the sliding block, and therefore the flexible panel always keeps flat and force on the flexible bending area is greatly reduced.

The foldable terminal device provided in the embodiments of this application is described in detail above. The principle and implementation of this application are described herein by using specific examples. The description about the foregoing embodiments is merely used to help understand the method and core ideas of this application. In addition, a person of ordinary skill in the art can make variations and modifications to the specific implementations and application scopes based on the ideas of this application. In conclusion, the content of this specification shall not be construed as a limitation on this application.

What is claimed is:

1. A foldable terminal device, comprising: a foldable flexible panel, a first support component, a second support component, and a connection mechanism, wherein the foldable flexible panel comprises a first display area, a second display area, and a bending area, and the bending area is located between the first display area and the second display area; the first support component supports the first display area and is fixed to the first display area, and the second support component supports the second display area and is fixed to the second display area; the connection mechanism connects the first support component and the second support component, the connection mechanism is scalable, and a maximum scalable amplitude of the connection mechanism is corresponding to a width of the bending area; and in a process of folding or unfolding the terminal device, at least one of the first support component or the second support component rotates by external force and drives the connection mechanism to scale, an angle by which the at least one of the first support component and the second support component rotates is in a one-to-one correspondence with a scaling displacement of the connection mechanism, and a bending angle of the foldable flexible panel is in a one-to-one correspondence with the scaling displacement of the connection mechanism, to prevent the foldable flexible panel from being stretched or squeezed in the process of folding or unfolding the terminal device, wherein the terminal device further comprises a first base plate and a second base plate, the first base plate is fixedly connected to the first support component, and the second base plate is fixedly connected to the second support component; the connection mechanism comprises a first sliding block and a second sliding block, a first sliding track is disposed on the first base plate, a second sliding track is disposed on the second base plate, the first sliding block is configured to slide in the first sliding track, and the second sliding block is configured to slide in the second sliding track; a first sliding rail is disposed on the first sliding block, and a first sliding slot is disposed on the first base plate; and a second sliding rail is disposed on the second sliding block, and a second sliding slot is disposed on the second base plate; the first sliding block and the first base plate are movably connected by using the first sliding rail and the first sliding slot, and the second sliding block and the second base plate are movably connected by using the second sliding rail and the second sliding slot; and when the first sliding block and the second sliding block rotate around a rotating shaft mechanism, the first sliding rail slides in the first sliding slot within an adjustable distance between the first support component and the connection mechanism, and the second sliding rail slides in the second sliding slot within an adjustable distance between the second support component and the connection mechanism, and wherein the rotating shaft mechanism comprises a first rotating shaft, a second rotating shaft, a push block, and a push rod, wherein the push block and the push rod are connected by using a first connecting piece; a first connecting rod and a second connecting rod are installed on the push rod, the first connecting rod and a third connecting rod are movably connected by using a second connecting piece, and the second connecting rod and a fourth connecting rod are movably connected by using a third connecting piece; the third connecting rod is connected to the first base plate by using a fourth connecting piece, the third connecting rod is connected to the first sliding block by using a fifth connecting piece, the fourth connecting rod is connected to the second base plate by using a sixth connecting piece, and the fourth connecting rod is connected to the second sliding block by using a seventh connecting piece; and the first base plate and the second base plate respectively drive the first rotating shaft and the second rotating shaft to rotate, so that the push block drives the push rod to slide in a vertical direction; the push rod drives the first connecting rod and the second connecting rod to slide in a vertical direction; and the first connecting rod drives the third connecting rod to rotate, the third connecting rod rotates to drive the first sliding block to slide on the first base plate, the second connecting rod drives the fourth connecting rod to rotate, and the fourth connecting rod drives the second sliding block to slide on the second base plate.

2. The terminal device according to claim 1, wherein the connection mechanism comprises the rotating shaft mechanism, and the first sliding block and the second sliding block are respectively installed on two sides of the rotating shaft mechanism.

3. The terminal device according to claim 2, wherein
the first sliding block comprises a first irregular hole, the rotating shaft mechanism comprises a first irregular shaft, and the first irregular shaft passes through the first irregular hole, so that the first sliding block is connected to the rotating shaft mechanism; and
the second sliding block comprises a second irregular hole, the rotating shaft mechanism comprises a second irregular shaft, and the second irregular shaft passes through the second irregular hole, so that the second sliding block is connected to the rotating shaft mechanism.

4. The terminal device according to claim 1, wherein a rotating shaft sliding slot is disposed on each of the first rotating shaft and the second rotating shaft, and convex hulls are disposed on the push block; and when the first rotating shaft and the second rotating shaft rotate, the convex hulls on the push block slide in the rotating shaft sliding slot, so that the push block drives the push rod to slide in a vertical direction.

* * * * *